(12) United States Patent
Watanabe et al.

(10) Patent No.: US 8,945,259 B2
(45) Date of Patent: Feb. 3, 2015

(54) CONSTRUCTION MACHINE

(71) Applicant: Kobelco Construction Machinery Co., Ltd., Hiroshima-shi (JP)

(72) Inventors: Sachiko Watanabe, Hiroshima (JP); Hiroaki Nishimoto, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 148 days.

(21) Appl. No.: 13/716,820

(22) Filed: Dec. 17, 2012

(65) Prior Publication Data

US 2013/0174526 A1    Jul. 11, 2013

(30) Foreign Application Priority Data

Jan. 10, 2012    (JP) .................................. 2012-002427

(51) Int. Cl.
| | | |
|---|---|---|
| *B60H 1/26* | (2006.01) | |
| *B60H 3/06* | (2006.01) | |
| *B62D 33/06* | (2006.01) | |
| *B01D 46/00* | (2006.01) | |
| *E02F 9/08* | (2006.01) | |

(52) U.S. Cl.
CPC .......... *B01D 46/0005* (2013.01); *E02F 9/0866* (2013.01); *B01D 2265/026* (2013.01)
USPC ..................... 55/385.3; 123/198 E

(58) Field of Classification Search
USPC .......... 55/385.1, 385.3; 454/158; 296/190.09, 296/190.1, 190.11; 248/55, 58, 60, 62; 180/89.2, 309; 267/152, 165
See application file for complete search history.

(56) References Cited

U.S. PATENT DOCUMENTS

| | | | | |
|---|---|---|---|---|
| 7,678,168 | B2 * | 3/2010 | Connelly et al. | ............. 55/385.3 |
| 8,430,450 | B2 * | 4/2013 | Stephens et al. | ......... 296/190.09 |
| 8,435,337 | B2 * | 5/2013 | Lee et al. | ......................... 96/397 |
| 8,747,523 | B2 * | 6/2014 | Spryshak | ........................ 95/268 |
| 2008/0202451 | A1 | 8/2008 | Taniuchi et al. | |
| 2014/0157736 | A1 * | 6/2014 | Choi | ............................ 55/385.3 |

FOREIGN PATENT DOCUMENTS

| | | | |
|---|---|---|---|
| JP | 2004-225278 | A | 8/2004 |
| JP | 2008-208551 | | 9/2008 |
| JP | 2008-241129 | A | 10/2008 |
| JP | 2010-236442 | A | 10/2010 |

OTHER PUBLICATIONS

Extended European Search Report issued Mar. 25, 2013 in Patent Application No. 13150215.5.

* cited by examiner

*Primary Examiner* — Duane Smith
*Assistant Examiner* — Minh-Chau Pham
(74) *Attorney, Agent, or Firm* — Oblon, Spivak, McClelland, Maier & Neustadt, L.L.P.

(57) ABSTRACT

In a construction machine, an equipment room cover is formed with a maintenance hole, which has such a shape as to allow an air filter to pass, at a position on a rear side of the air filter mounted to a filter mounting portion of an air intake duct. A locking device of the filter mounting portion has a movable member movable between a locking position and a lock-releasing position. In the locking position, the movable member contacts with a rear surface of the air filter in a state that a front surface of the air filter is contacted with a contact member so that the air filter is sandwiched and held between the movable member and the contact member. In the lock-releasing position, the movable member is moved away from the rear surface of the air filter for allowing movement of the air filter toward the rear side.

4 Claims, 7 Drawing Sheets

CONSTRUCTION MACHINE

BACKGROUND OF THE INVENTION

1. Field of the Invention

The present invention relates to a construction machine.

2. Background Art

Conventionally, there has been known a construction machine provided with a lower propelling body, and an upper slewing body loaded on the lower propelling body, wherein the upper slewing body has an equipment room cover for covering an equipment room provided on the upper slewing body. An example of such a construction machine is disclosed in Japanese Unexamined Patent Publication No. 2008-208551.

An air intake duct, a radiator, a fan, and an engine are disposed in this order from the upstream side with respect to an airflow direction within the equipment room of the construction machine. An air filter is mounted to the air intake duct. A filter contact surface facing the upstream side of airflow is formed along the entire circumference of a filter mounting portion of the air intake duct. Further, an elastic member constituted of a plate spring is provided on a front end side portion of the filter mounting portion, the front end side corresponding to a far side when viewed from a maintenance port of an equipment room cover. By pressing an upstream side surface of the air filter with respect to the airflow direction by the elastic member constituted of the plate spring, the air filter is pressed against the filter contact surface, and the position of the air filter is fixed. An air filter mounting/dismounting operation with respect to the filter mounting portion is performed by dismounting the air filter from the filter mounting portion toward the upstream side with respect to the airflow direction, or by mounting the air filter to the filter mounting portion from the upstream side with respect to the airflow direction.

In a small-slewable type construction machine, various pieces of equipment are densely disposed in an equipment room. In particular, in the case where an equipment such as an air cleaner is disposed on the upstream side of an air filter with respect to an airflow direction, it is difficult to sufficiently secure a space for installing an elastic member which is operable to press the air filter against a filter mounting portion for fixing the position of the air filter, or to sufficiently secure a work space for mounting and dismounting the air filter.

SUMMARY OF THE INVENTION

An object of the invention is to provide an arrangement that enables to dispose a locking device for fixing the position of an air filter in an equipment room, and enables to smoothly mount or dismount the air filter, even if the space in the equipment room on the upstream side of the air filter with respect to an airflow direction is limited.

A construction machine according to an aspect of the invention is provided with a lower propelling body, and an upper slewing body loaded on the lower propelling body. The upper slewing body includes an equipment room cover which covers an equipment room provided on the upper slewing body, a radiator which is disposed in the equipment room, an air intake duct which is disposed on an upstream side of the radiator with respect to an airflow direction in the equipment room, and an air filter which filters an airflow to be taken into the air intake duct. The radiator has a core surface, and is disposed in such a manner that the core surface faces one side in width direction of the upper slewing body, the core surface being a surface for receiving an airflow taken into the radiator. The air intake duct has a filter mounting portion to which the air filter is dismountably mounted. The air filter has a filter surface, and is mounted to the filter mounting portion in a state that the filter surface faces the core surface of the radiator, the filter surface being a surface through which an airflow filtered through the air filter is allowed to exit. The equipment room cover is formed with a maintenance hole at a position corresponding to a rear side of the air filter mounted to the filter mounting portion, the maintenance hole having such a shape as to allow the air filter to pass. The filter mounting portion has a pair of guide members extending along an upper surface and a lower surface of the air filter mounted to the filter mounting portion respectively, a contact member which is contacted with a front surface of the air filter mounted to the filter mounting portion, and a locking device which fixes a position of the air filter in a state that the front surface of the air filter is contacted with the contact member. The locking device has a movable member which is configured to be movable between a locking position and a lock-releasing position, the movable member being configured in such a manner that when the movable member is in the locking position, the movable member contacts with a rear surface of the air filter in a state that the front surface of the air filter is contacted with the contact member while the air filter is disposed between the paired guide plates, thereby the air filter is sandwiched and held between the movable member and the contact member, and that when the movable member is in the lock-releasing position, the movable member is moved away from the rear surface of the air filter in a state that the front surface of the air filter is contacted with the contact member while the air filter is disposed between the paired guide plates for allowing movement of the air filter toward the rear side of the air filter.

DETAILED DESCRIPTION OF THE EMBODIMENTS OF THE INVENTION

Figure 1:
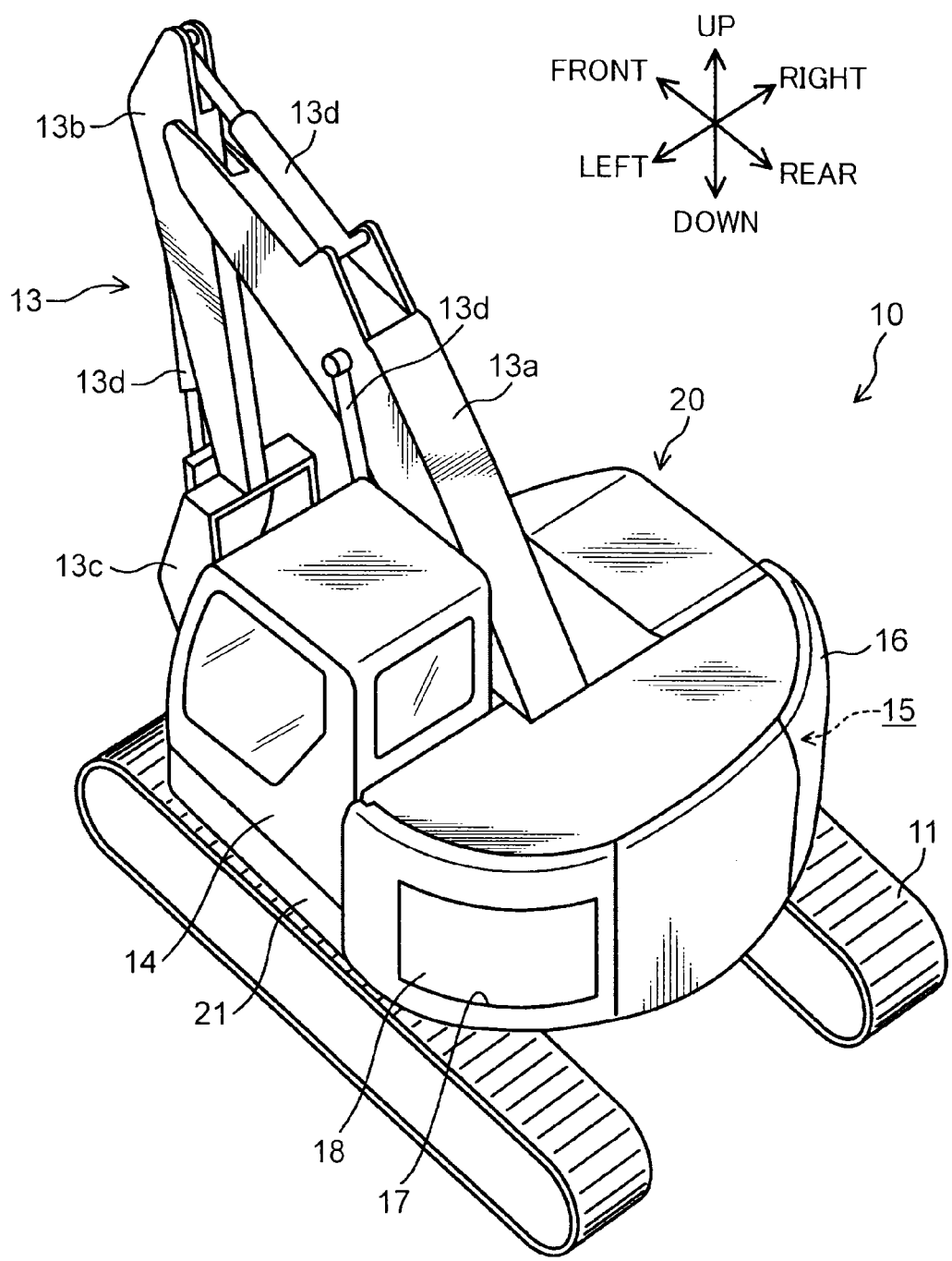
FIG. 1 is a perspective view showing an entire arrangement of a construction machine according to an embodiment of the invention.

In the following, an embodiment of the present invention is described referring to the drawings. The following description is essentially by way of illustration only, and thus does not limit the present invention, applications of the present invention and an intended use of the present invention.

FIG. 1 is a perspective view showing an entire arrangement of a construction machine according to an embodiment of the present invention. FIG. 1 shows up and down directions, front and rear directions, and left and right directions by the respective corresponding arrows. In the following, unless specifically mentioned, the respective directions correspond to the directions indicated by the respective corresponding arrows.

As shown in FIG. 1, a construction machine 10 according to the embodiment of the present invention is provided with a crawler-type lower propelling body 11, and an upper slewing body 20 loaded on the lower propelling body 11 to be slewable. The upper slewing body 20 is provided with e.g. an attachment 13, a cab 14, an equipment room 14, and an upper frame 21. The construction machine 10 of the embodiment is a small-slewable type construction machine. Specifically, the construction machine 10 of the embodiment is configured in such a manner that the upper slewing body 20 has a relatively small size, and that the outer perimeter of a rear portion of the upper slewing body 20 has an arc shape when viewed from above, for making a slewing radius of the upper slewing body 20 small.

The attachment 13 is disposed on a front portion of the upper slewing body 20. The attachment 13 is constituted of e.g. a boom 13a, an arm 13b, a bucket 13c, and three hydraulic cylinders 13d. The three hydraulic cylinders 13d are constituted of a hydraulic cylinder for driving the boom 13a, a hydraulic cylinder for driving the arm 13b, and a hydraulic cylinder for driving the bucket 13c. The boom 13a, the arm 13b, and the bucket 13c are respectively operated in association with expansion/contraction of the respective corresponding hydraulic cylinders 13d in accordance with hydraulic control of the hydraulic cylinders 13d. A work such as excavation is performed by the operations of the boom 13a, the arm 13b, and the bucket 13c. The operations of the boom 13a, the arm 13b, and the bucket 13c are performed by an operator in the cab 14.

The cab 14 is a rectangular box-shaped operating room. The cab 14 is disposed on a front left portion of the upper slewing body 20 in adjacent to the attachment 13.

The equipment room 15 is disposed on the rear portion of the upper slewing body 20. The upper slewing body 20 is provided with an equipment room cover 16 covering the periphery of the equipment room 15. An engine 31 (see FIG. 2), hydraulic equipments, and the like are densely accommodated in the equipment room 15. In the construction machine 10 of the present embodiment, the equipment room cover 16 covering a rear portion of the equipment room 15 also serves as a counterweight for securing a weight balance in front and rear directions with respect to the attachment 13.

A maintenance hole 17 is formed in a rear left portion of the equipment room cover 16. The maintenance hole 17 is an opening used to perform maintenance operation of various pieces of equipment disposed in the equipment room 15. The maintenance hole 17 is formed in a specific portion of the equipment room cover 16, the specific portion being located at a position on the rear side of an air filter 50 to be described later, which is mounted to a filter mounting portion 42 to be described later. The maintenance hole 17 has such a shape and size that the air filter 50 is allowed to pass. The operator is allowed to perform an exchange operation of the air filter 50 by taking out the air filter 50 from the equipment room 15 to the rear side of the air filter 50 through the maintenance hole 17, and by inserting a new air filter 50 into the equipment room 15 through the maintenance hole 17. An opening/closing door 18 for opening/closing the maintenance hole 17 is attached to the equipment room cover 16.

Figure 2:
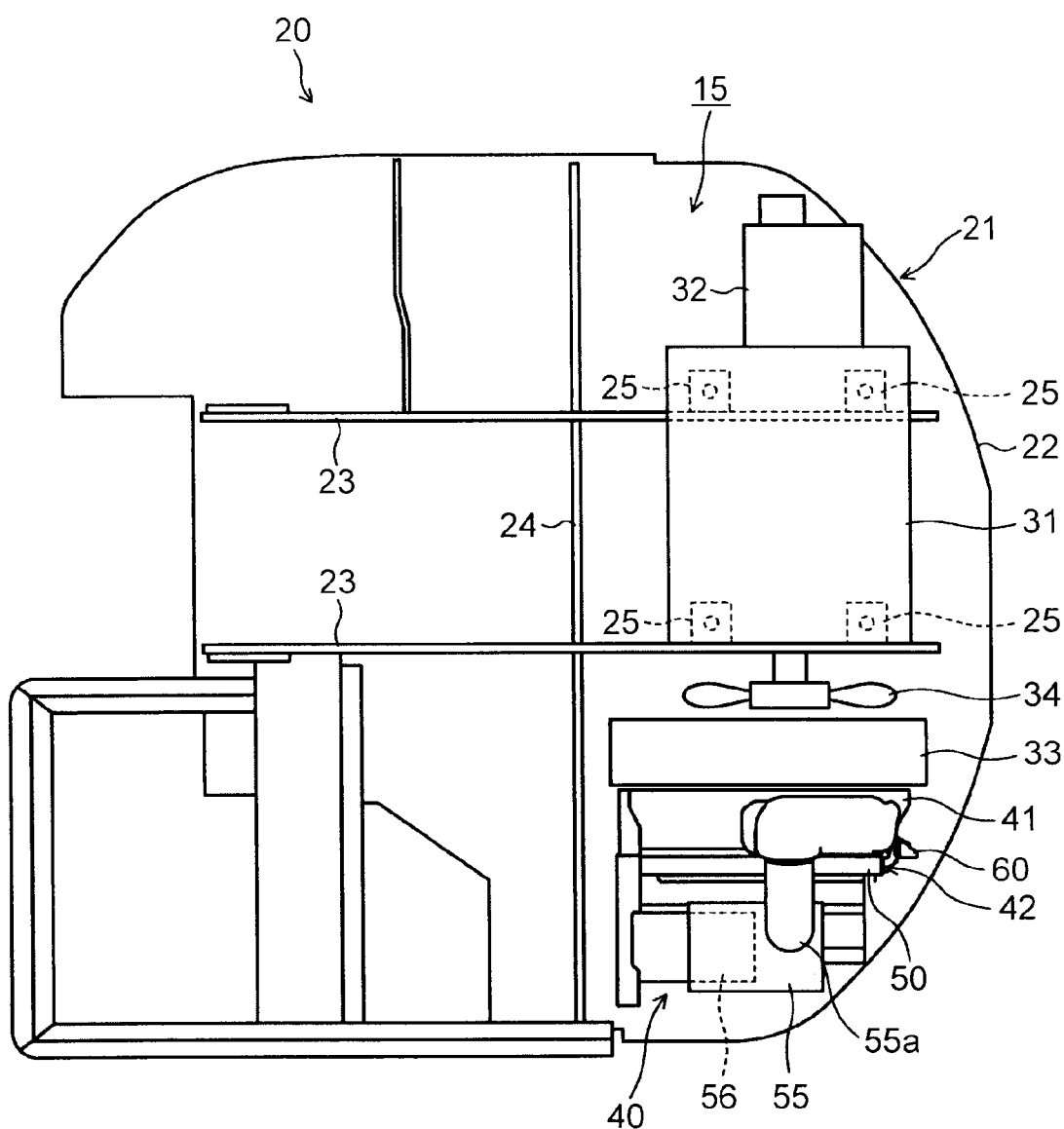
FIG. 2 is a plan view showing an internal arrangement of an upper slewing body.

As shown in FIG. 2, an upper frame 21 is disposed on a lower portion of the upper slewing body 20; and the cab 14, the equipment room 15, etc. are disposed on the upper frame 21. The upper frame 21 is provided with a bottom plate 22, a pair of vertical plates 23, a beam plate 24, and seat portions 25, etc.

The bottom plate 22 is formed of a metal plate member having a top surface of a sufficient area. The cab 14 is disposed on a front-side left corner portion of the bottom plate 22. Although not illustrated, a slewing mechanism is provided at a position close to a front side, on a widthwise intermediate portion of the bottom plate 22. The bottom plate 22 is supported on the lower propelling body 11 via the slewing mechanism to be slewable.

The paired vertical plates 23 extend in front and rear directions from a position near a front end of the bottom plate 22 to a position near a rear end the bottom plate 22, on an intermediate portion of the bottom plate 22 in a width direction of the bottom plate 22. Specifically, the paired vertical plates 23 extend in parallel to each other. Each of the vertical plates 23 stands upright in a direction orthogonal to the bottom plate 22 by welding attachment to the bottom plate 22. A base end portion of the boom 13a of the attachment 13 is disposed between the paired vertical plates 23. The boom 13a is supported by the paired vertical plates 23 to be pivotally movable. A plurality of seat portions 25 are provided on each of the vertical plates 23.

The beam plate 24 is formed of a strip-shaped metal plate member. The beam plate 24 extends in a width direction (in left and right directions) of the bottom plate 22 from a left end of the bottom plate 22 to a right end thereof, on a longitudinally intermediate portion (an intermediate portion in front and rear directions) of the bottom plate 22. The beam plate 24 is joined to the bottom plate 22 and to the paired vertical plates 23 to be integral with the bottom plate 22 and with the paired vertical plates 23.

The upper slewing body 20 is provided with an engine 31, a hydraulic pump 32, a radiator 33, a fan 34, an air intake duct 40, the air filter 50, and an air cleaner 55, etc.

Figure 3:
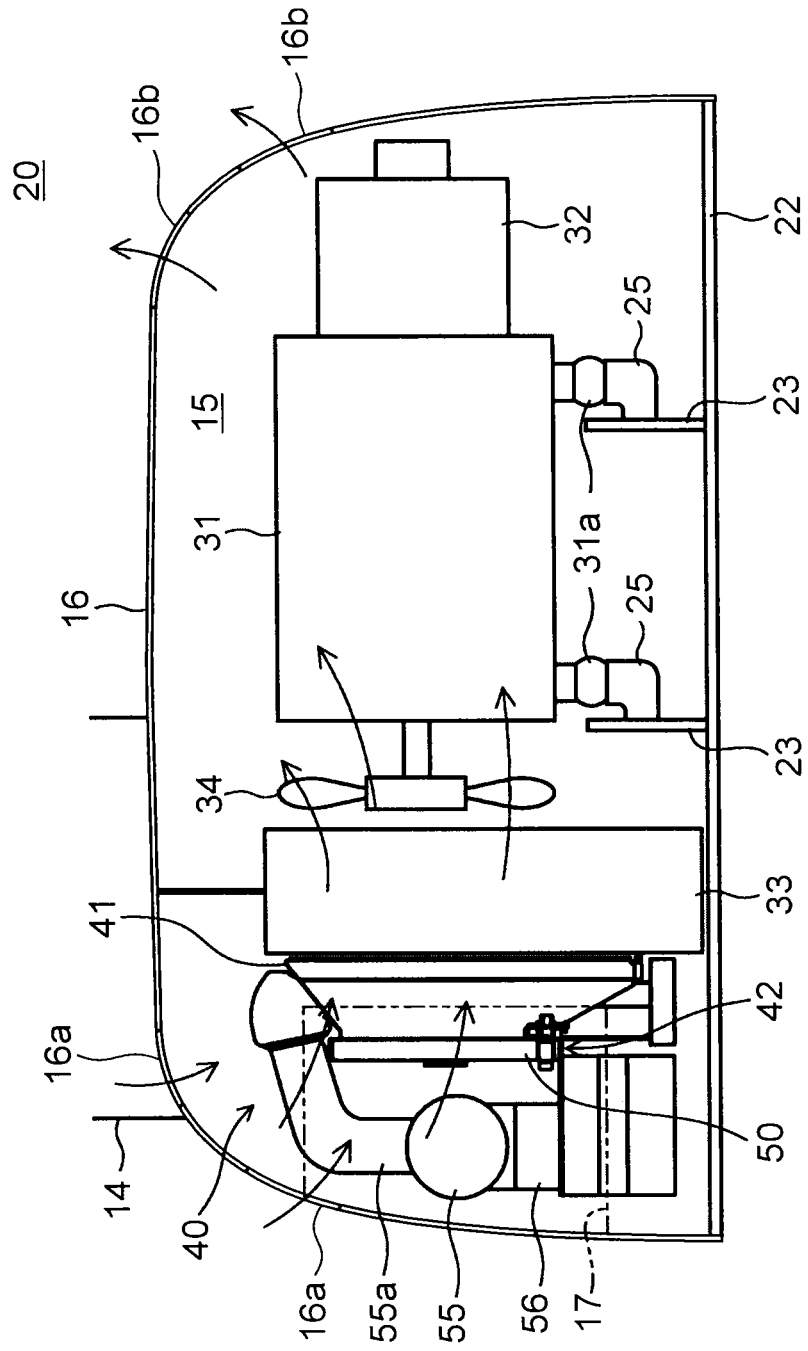
FIG. 3 is a rear view showing the internal arrangement of the upper slewing body.

As shown in FIG. 3, the engine 31 is installed on the seat portions 25 via anti-vibration members 31a. The engine 31 is accommodated in the equipment room 15 in a posture that a driving shaft of the engine 31 extends in a width direction (in left and right directions) of the bottom plate 22. An air intake port 16a is formed in an upper portion on the left side of the equipment room cover 16. An air discharge port 16b is formed in an upper portion on the right side of the equipment room cover 16.

The hydraulic pump 32, the radiator 33, the fan 34, the air intake duct 40, etc. are accommodated in the equipment room 15. In the construction machine 10 of the present embodiment, the air intake duct 40, the radiator 33, the fan 34, the engine 31, and the hydraulic pump 32 are disposed side by side in this order from the upstream side toward the downstream wide with respect to the airflow direction in the equipment room 15.

The radiator 33 has a pair of core surfaces. One core surface of the paired core surfaces is disposed to face one side (left side) in a width direction of the upper slewing body 20, the one core surface receiving an airflow to be taken into the radiator 33. The fan 34 is disposed between the main body of the engine 31 and the radiator 33 in a state that the fan 34 is connected to a left end of the driving shaft of the engine 31. The hydraulic pump 32 is disposed in a position near a right end of the equipment room 15 in a state that the hydraulic pump 32 is connected to a right end of the driving shaft of the engine 31.

In the construction machine 10 of the present embodiment, during operation of the engine 31, as shown by the arrow directions shown in FIG. 3, an airflow directing from the left side toward the right side is formed in the equipment room 34, and the engine 31, etc. are cooled by a refrigerant for use in heat exchange with the airflow in the radiator 33. Specifically, when the fan 12 is rotated, outside air is taken into the equipment room 15 through the air intake port 16a. The intake air in the equipment room 15 forms a hot airflow by absorbing the heat of the refrigerant flowing through the radiator 33 while passing through the radiator 33. Then, the hot airflow is discharged to the outside of the equipment room 15 through the air discharge port 16b.

Figure 4:
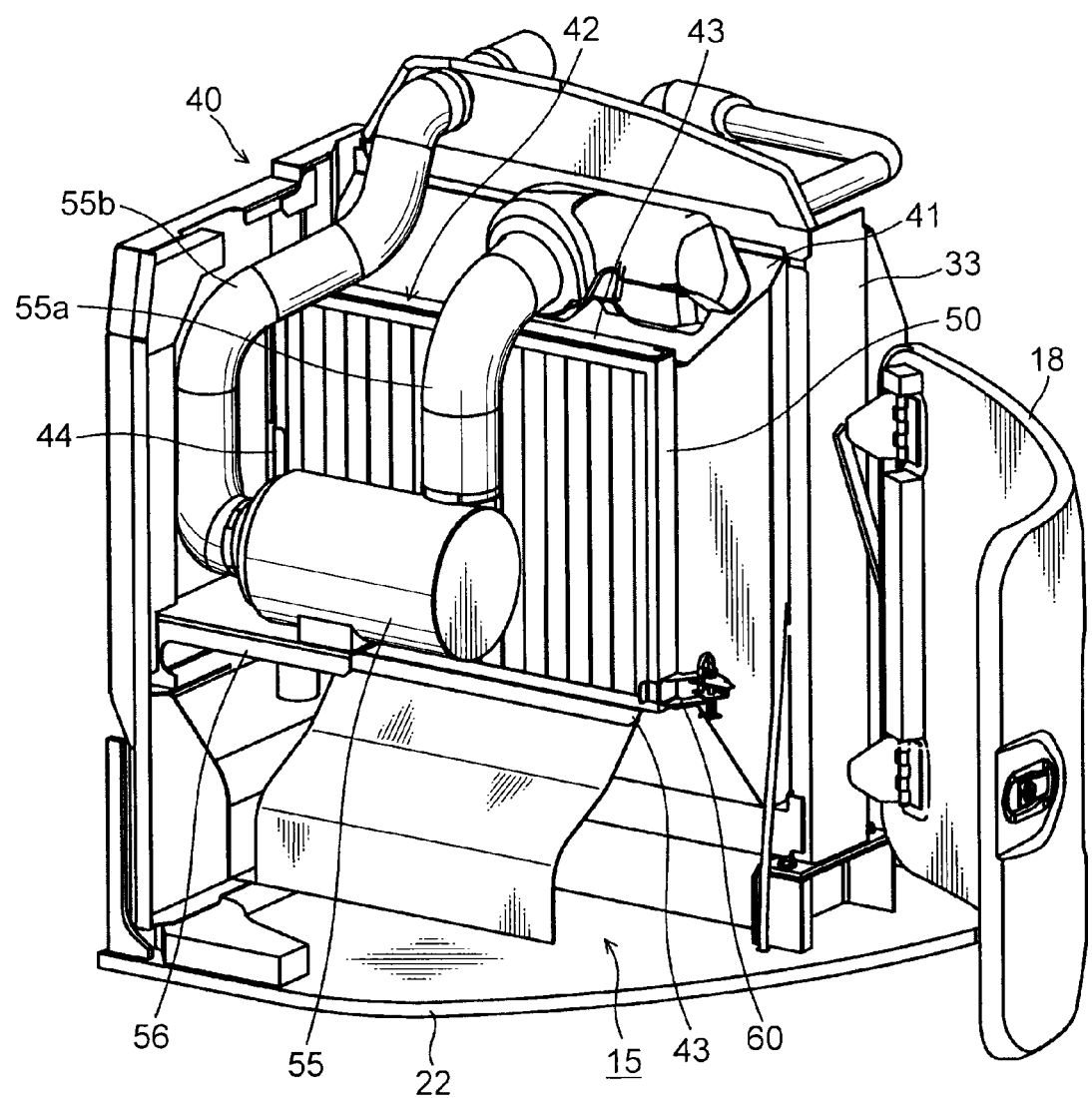
FIG. 4 is a perspective view showing a configuration of an air intake duct.

As also shown in FIG. 4, the air intake duct 40 has a box-shaped duct body 41, the filter mounting portion 42 and an equipment mounting portion 56. The duct body 41 is respectively opened at an upstream end thereof and at a downstream end thereof with respect to the airflow direction, and is configured to increase the opening area thereof in the direction from the upstream end thereof toward the downstream end thereof. The filter mounting portion 42 and the equipment mounting portion 56 are attached to the duct body 41. The filter mounting portion 42 is adapted to be mounted the air filter 50, and the equipment mounting portion 56 is adapted to be mounted the air cleaner 55 as an equipment.

The air filter 50 is adapted to filter the airflow to be taken into the air intake duct 40. The air filter 50 has a filter surface, as a surface through which the air filtered through the air filter 50 is allowed to exit. The air filter 50 is mounted to the filter mounting portion 42 in a state that the filter surface, through which the air filtered through the air filter 50 is allowed to exit, faces the core surface of the radiator 33 which receives the airflow taken into the radiator 33.

The air cleaner 55 is adapted to collect the dust from the air to be supplied to the engine 31. The air cleaner 55 is connected to an air intake pipe 55a bypassed from the duct body 41, and an air exhaust pipe 55b extending to the engine 31.

The filter mounting portion 42 is provided on the upstream end of the duct body 41. The air filter 50 is dismountably mounted to the filter mounting portion 42. The filter mounting portion 42 has a pair of guide plates 43 (guide members) extending along an upper surface and a lower surface of the air filter 50 mounted to the filter mounting portion 42 respectively, a contact plate 44 (a contact member) disposed on a front portion of the duct body 41, and a locking device 60 disposed on a rear portion of the duct body 41.

The paired guide plates 43 are vertically disposed away from each other, and extend in front and rear directions to be in parallel to each other. The air filter 50 is accommodated in a space between the paired guide plates 43. Further, the paired guide plates 43 have a function of guiding the air filter 50 in the case where the air filter 50 is inserted in and removed from the equipment room 15 through the maintenance hole 17 of the equipment room cover 16.

Figure 5:
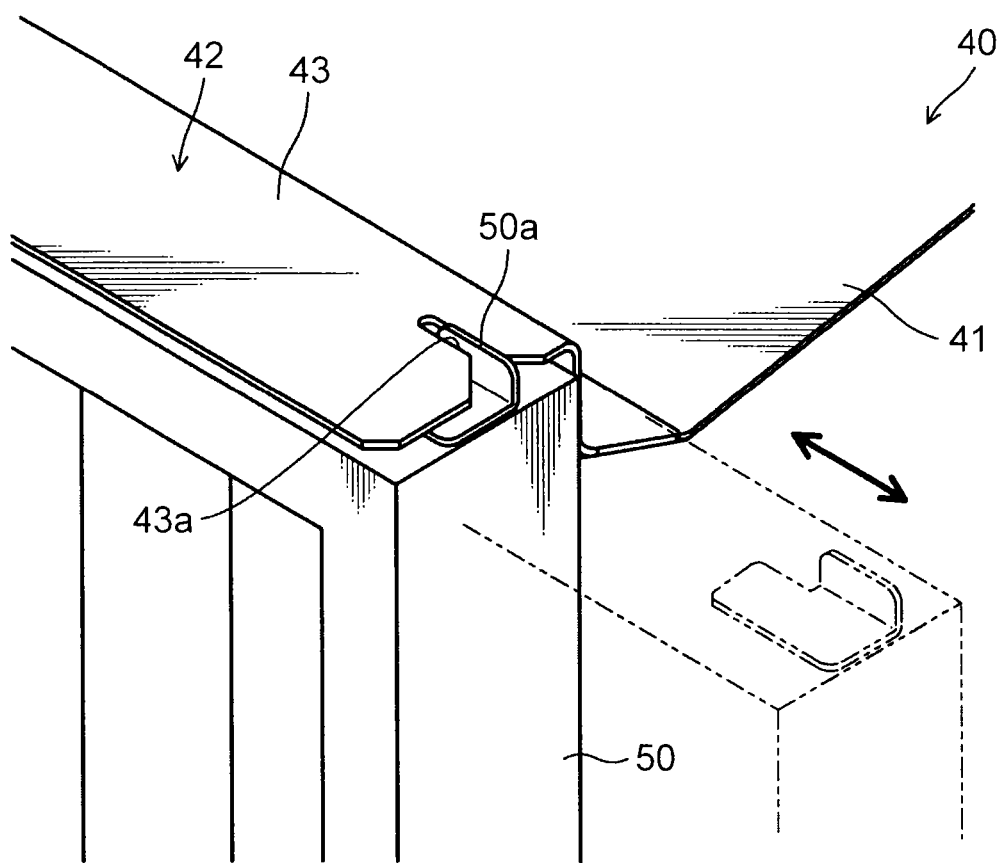
FIG. 5 is a perspective view showing a configuration of a projection plate of an air filter.

As shown in FIG. 5, a cutaway 43a opening rearward is formed in a rear end of the upper guide plate 43 of the paired guide plates 43, i.e., in a rear end of the guide plate 43 extending along the upper surface of the air filter 50 to be mounted to the filter mounting portion 42. An upwardly projecting projection plate 50a (a projection member) is attached to a rear end portion of the upper surface of the air filter 50. The projection plate 50a has a portion which is disposed along the upper surface of the air filter 50 and is fixed on the upper surface of the air filter 50, and a portion which is bent from the fixed portion and upwardly projects from the upper surface of the air filter 50. The projection plate 50a is fitted in the cutaway 43a in a state that the air filter 50 is mounted to the filter mounting portion 42. Specifically, in the case where the air filter 50 is accommodated in the space between the paired guide plates 43, the projection plate 50a is fitted in the cutaway 43a of the guide plate 43 from rear side of the cutaway 43a. With this configuration, the air filter 50 is positioned in the thickness direction thereof.

The contact plate 44 is contacted with a front surface of the air filter 50 to be mounted to the filter mounting portion 42. With this configuration, in the case where the air filter 50 is inserted into the equipment room 15 from the rear side of the equipment room 15 toward the front side of the equipment room 15, the depthwise position of the air filter 50 is defined. Further, a left end portion of the contact plate 44 is bent toward the rear side of the upper slewing body 20. An inner surface (a right surface) of the bended left end portion is contacted with a left surface of the air filter 50, whereby the air filter 50 is positioned in the thickness direction thereof.

Figure 6:
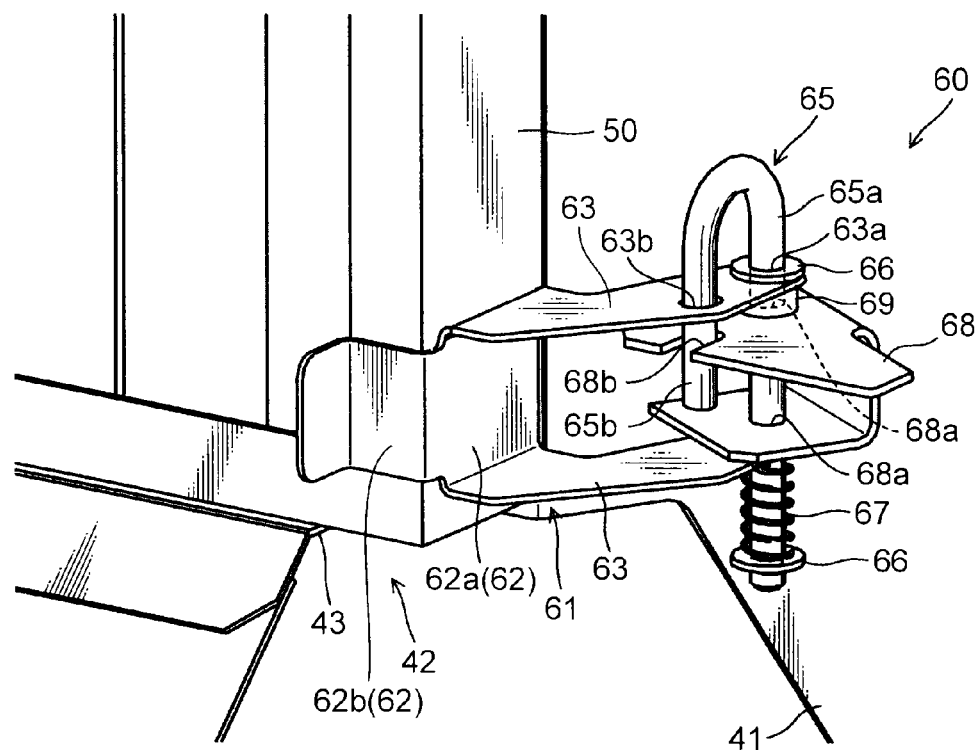
FIG. 6 is a perspective view showing a locking device in a state that a movable member is disposed in a locking position.

The locking device 60 is adapted to fix the position of the air filter 50 in a state that the front surface of the air filter 50 is contacted with the contact plate 44. As shown in FIG. 6, the locking device 60 is provided with a movable member 61 which is contacted with the air filter 50 when the position of the air filter 50 is fixed, a shaft member 65 supporting the movable member 61 in such a manner that the movable member 61 is pivotable, and a retaining member 68 retaining the shaft member 65.

Figure 7:
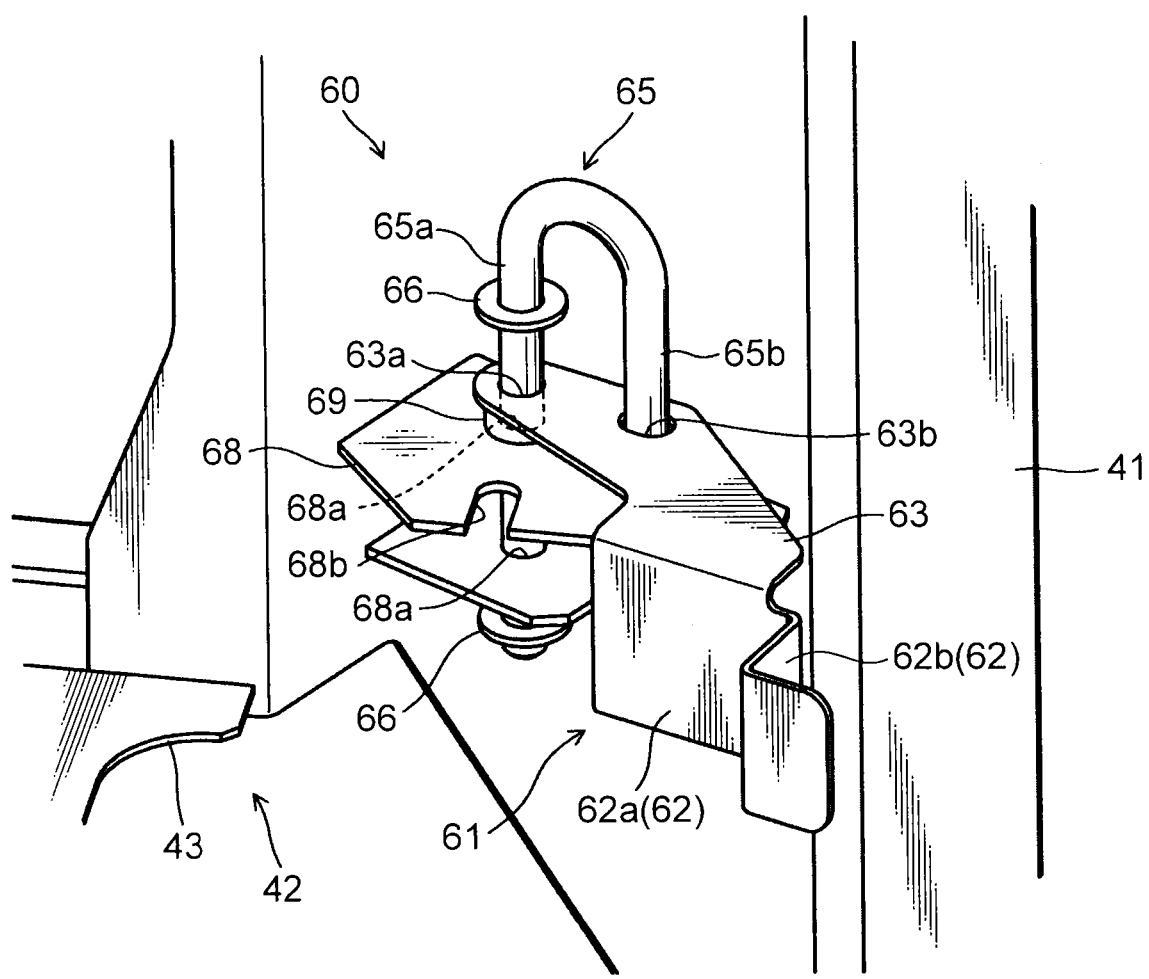
FIG. 7 is a perspective view showing the locking device in a state that the movable member is disposed in a lock-releasing position.

The movable member 61 is pivotally movable between a locking position shown in FIG. 6, and a lock-releasing position shown in FIG. 7. When the movable member 61 is in the locking position, the movable member 61 contacts with a rear surface of the air filter 50 in a state that the front surface of the air filter 50 is contacted with the contact plate 44 while the air filter 50 is disposed between the paired guide plates 43, thereby the air filter 50 is sandwiched and held between the movable member 61 and the contact plate 44. Further, when the movable member 61 is in the lock-releasing position, the movable member 61 is moved away from the rear surface of the air filter 50 in a state that the front surface of the air filter 50 is contacted with the contact plate 44 while the air filter 50 is disposed between the paired guide plates 43 for allowing movement of the air filter 50 toward the rear side of the air filter 50. The movable member 61 has a locking plate 62 which is bent in such a manner as to contact with the rear surface of the air filter 50 and with an upstream side surface of the air filter 50 with respect to the airflow direction in a state that the movable member 61 is disposed in the locking position, and a pair of arm plates 63 integral with the locking plate 62. The locking plate 62 and the paired arm plates 63 are formed by bending one plate member. Specifically, the paired arm plates 63 are separately located at an upper side of the locking plate 62 and a lower side of the locking plate 62. The upper arm plate 63 is made of a plate-shaped portion which is bent from an upper end periphery of a portion of the locking plate 62, which is contacted with the rear surface of the air filter 50, toward the rear side. The lower arm plate 63 is made of a plate-shaped portion which is bent from a lower end periphery of a portion of the locking plate 62, which is contacted with the rear surface of the air filter 50, toward the rear side.

The locking plate 62 is a member for holding and fixing the air filter 50 in association with the contact plate 44 by contact with the rear surface of the air filter 50 and with the upstream side surface of the air filter 50 with respect to the airflow direction. Specifically, the locking plate 62 has a rear-side contact plate portion 62a which is disposed to extend along the rear surface of the air filter 50 and is contacted with the rear surface of the air filter 50 in a state that the movable member 61 is disposed in the locking position, and a plate-shaped upstream-side contact plate portion 62b which is disposed to extend along the upstream side surface of the air filter 50 with respect to the airflow direction and is contacted with the upstream side surface of the air filter 50 in a state that the movable member 61 is disposed in the locking position.

The locking plate 62 is pivotally movable in association with the arm plates 63 about a central shaft portion 65a of the shaft member 65 to be described later. In the case where the movable member 61 is disposed in the locking position, the rear-side contact plate portion 62a of the locking plate 62 is contacted with the rear surface of the air filter 50, and the upstream-side contact plate portion 62b of the locking plate 62 is contacted with the upstream side surface of the air filter 50 with respect to the airflow direction, whereby the position of the air filter 50 is fixed. On the other hand, in the case where the movable member 61 is disposed in the lock-releasing position, the rear-side contact plate portion 62a of the locking plate 62 is moved away from the rear surface of the air filter 50, and the upstream-side contact plate portion 62b of the locking plate 62 is moved away from the upstream side surface of the air filter 50 with respect to the airflow direction, whereby the position fixation of the air filter 50 is released. As a result, rearward movement of the air filter 50 is allowed.

As described above, in the present embodiment, since the air filter 50 is sandwiched in front and rear directions by the contact plate 44 and the locking device 60 so as to be fixed, there is no need of disposing a major portion of the locking device 60 on the upstream side of the air filter 50. Thus, it is possible to dispose the locking device 60 in the equipment room 15, even if the space in the equipment room 15 on the upstream side of the air filter 50 with respect to the airflow direction is limited.

Each of the arm plates 63 is formed with a central shaft through-hole 63a through which the central shaft portion 65a of the shaft member 65 to be described later is allowed to pass. The central shaft through-hole 63a is formed to vertically pass through each of the arm plates 63. Further, the upper arm plate 63 of the paired arm plates 63 is formed with an engagement shaft through-hole 63b through which an engagement shaft portion 65b of the shaft member 65 to be described later is allowed to pass. The retaining member 68 is disposed between the upper and lower arm plates 63. A spacer member 69 is disposed between the upper arm plate 63 and the upper surface of the retaining member 68.

The shaft member 65 has the central shaft portion 65a serving as a center of pivotal movement of the movable member 61, and the engagement shaft portion 65b which is disposed in parallel to the central shaft portion 65a. The central shaft portion 65a is a member for supporting the movable member 61 in such a manner that the movable member 61 is pivotally movable between the locking position and the lock-releasing position. The shaft member 65 is formed by bending one shaft member. The central shaft portion 65a and the engagement shaft portion 65b are constituted of specific portions of the bent shaft member, the specific portions extending parallel to each other. The entire length of the central shaft portion 65a is set larger than the entire length of the engagement shaft portion 65b. Stopper plates 66 are respectively mounted at an upper position of the central shaft portion 65a with respect to the upper arm plate 63 and at a lower position of the central shaft portion 65a with respect to the lower arm plate 63. A compression spring 67 is provided between the lower stopper plate 66 and the lower surface of the lower arm plate 63. The compression spring 67 biases the lower stopper plate 66 downwardly in such a manner that the upper stopper plate 66 is pressed against the upper surface of the upper arm plate 63, in other words, in such a manner that the central shaft portion 65a is directed downwardly.

The retaining member 68 is attached to a rear surface of the duct body 41. The retaining member 68 retains the central shaft portion 65a in such a manner that the shaft member 65 is freely movable in the axis direction of the central shaft portion 65a. The retaining member 68 is formed by bending one plate member into a substantially U-shape. The retaining member 68 has a pair of upper and lower plate-shaped portions. Each of the plate-shaped portions is formed with a retaining hole 68a which passes through the corresponding plate-shaped portion. The central shaft portion 65a is inserted through the retaining hole 68a in a state that the central shaft portion 65a is freely movable in the axis direction of the central shaft portion 65a, whereby the central shaft portion 65a is retained. Further, the upper plate-shaped portion of the retaining member 68 is formed with an engaged portion 68b formed into such a shape as to be engageable with the engagement shaft portion 65b. The engaged portion 68b is constituted of a cutaway which is formed in the upper plate-shaped portion. By inserting the central shaft portion 65a through the retaining hole 68a, the shaft member 65 is retained by the retaining member 68 in such a manner that the shaft member 65 is freely movable in the axis direction of the central shaft portion 65a between an engagement position (see FIG. 6) and a disengagement position which is located above the engagement position. When the shaft member 65 is in the engagement position, the engagement shaft portion 65b is engaged with the engaged portion 68b for inhibiting pivotal movement of the movable member 61 in the locking position about the central shaft portion 65a relative to the retaining member 68, and when the shaft member 65 is in the disengagement position, the engagement shaft portion 65b is disengaged from the engaged portion 68b for allowing pivotal movement of the movable member 61 about the central shaft portion 65a relative to the retaining member 68. Here, the central shaft portion 65a is moved in the axis direction thereof relative to the retaining member 68, then the engagement shaft portion 65b moves in association with the central shaft portion 65a in the axis direction of the engagement shaft portion 65b relative to the retaining member 68. By moving the engagement shaft portion 65b as described above, the engagement shaft portion 65b is operable to engage with or disengage from the engaged portion 68b.

As described above, disposing the shaft member 65 to the engagement position inhibits pivotal movement of the movable member 61 in the locking position by the engagement shaft portion 65b. This is advantageous in securing positional fixation of the air filter 50 mounted to the filter mounting portion 42. Further, since the central shaft portion 65a as a center of pivotal movement of the movable member 61, and the engagement shaft portion 65b for inhibiting pivotal movement of the movable member 61 in the locking position are constituted by one shaft member 65, the above arrangement is advantageous in reducing the number of parts, thereby suppressing the manufacturing cost of the construction machine 10, and in reducing the installation space in the construction machine 10.

[Air Filter Locking Procedure and Lock-Releasing Procedure by a Locking Device]

In this section, a procedure of locking the air filter 50 by the locking device 60, and a procedure of releasing a locking of the air filter 50 by the locking device 60 are described referring to FIG. 6 and FIG. 7. As shown in FIG. 6, the locking plate 62 of the movable member 61 is contacted with the rear surface of the air filter 50 and with the upstream side surface of the air filter 50 with respect to the airflow direction in a state that the movable member 61 is disposed in the locking position. With this configuration, the air filter 50 is sandwiched and held between the contact plate 44 and the locking plate 62.

Then, in a state that the movable member 61 is disposed in the locking position, the shaft member 65 is disposed in the engagement position so that the engagement shaft portion 65b is engaged with the engaged portion 68b of the retaining member 68. By performing the above operation, it is possible to inhibit pivotal movement of the movable member 61 in the locking position about the central shaft portion 65a relative to the retaining member 68. In performing the above operation, the engagement shaft portion 65b is biased downwardly by the biasing force of the compression spring 67. Accordingly, there is no likelihood that the engagement shaft portion 65b is unintentionally disengaged from the engaged portion 68b. Thus, the movable member 61 is securely fixed to the locking position, which makes it possible to securely fix the position of the air filter 50 in a state that the air filter 50 is mounted to the filter mounting portion 42 of the air intake duct 40.

On the other hand, in the case where the air filter 50 is dismounted from the filter mounting portion 42, firstly, as shown in FIG. 7, the shaft member 65 is moved upwardly against the biasing force of the compression spring 67 so that the shaft member 65 is disposed in the disengagement position. Specifically, the shaft member 65 is lifted up to such a position that the lower end of the engagement shaft portion 65b is located at a position above the upper surface of the retaining member 68. By performing the above operation, the engagement shaft portion 65b is disengaged from the engaged portion 68b. In other words, engagement between the engagement shaft portion 65b and the engaged portion 68b is released. As a result of the releasing operation, pivotal movement of the movable member 61 about the central shaft portion 65a relative to the retaining member 68 is allowed. Thereafter, the movable member 61 is pivotally moved about the central shaft portion 65a so that the movable member 61 is shifted from the locking position to the lock-releasing position. By performing the above operation, the locking plate 62 of the movable member 61 which is in contact with the rear surface of the air filter 50 is moved away from the rear surface of the air filter 50. As a result of performing the above operation, there is no restraint for the movement of the air filter 50 toward the rear side by the locking plate 62. Therefore, it is allowed to dismount the air filter 50 from the filter mounting portion 42 toward the rear side along the paired guide plates 43, and to smoothly take out the air filter 50 to the outside of the equipment room 15 through the maintenance hole 17. In other words, it is possible to perform an exchange operation of the air filter 50, even if a sufficient work space for mounting and dismounting the air filter 50 is not secured on the upstream side of the air filter 50 with respect to the airflow direction.

SUMMARY OF THE EMBODIMENT

The embodiment described above may be summarized as follows.

A construction machine according to the embodiment is provided with a lower propelling body, and an upper slewing body loaded on the lower propelling body. The upper slewing body includes an equipment room cover which covers an equipment room provided on the upper slewing body, a radiator which is disposed in the equipment room, an air intake duct which is disposed on an upstream side of the radiator with respect to an airflow direction in the equipment room, and an air filter which filters an airflow to be taken into the air intake duct. The radiator has a core surface, and is disposed in such a manner that the core surface faces one side in width direction of the upper slewing body, the core surface being a surface for receiving an airflow taken into the radiator. The air intake duct has a filter mounting portion to which the air filter is dismountably mounted. The air filter has a filter surface, and is mounted to the filter mounting portion in a state that the filter surface faces the core surface of the radiator, the filter surface being a surface through which an airflow filtered through the air filter is allowed to exit. The equipment room cover is formed with a maintenance hole at a position corresponding to a rear side of the air filter mounted to the filter mounting portion, the maintenance hole having such a shape as to allow the air filter to pass. The filter mounting portion has a pair of guide members extending along an upper surface and a lower surface of the air filter mounted to the filter mounting portion respectively, a contact member which is contacted with a front surface of the air filter mounted to the filter mounting portion, and a locking device which fixes a position of the air filter in a state that the front surface of the air filter is contacted with the contact member. The locking device has a movable member which is configured to be movable between a locking position and a lock-releasing position, the movable member being configured in such a manner that when the movable member is in the locking position, the movable member contacts with a rear surface of the air filter in a state that the front surface of the air filter is contacted with the contact member while the air filter is disposed between the paired guide plates, thereby the air filter is sandwiched and held between the movable member and the contact member, and that when the movable member is in the lock-releasing position, the movable member is moved away from the rear surface of the air filter in a state that the front surface of the air filter is contacted with the contact member while the air filter is disposed between the paired guide plates for allowing movement of the air filter toward the rear side of the air filter.

The thus configured construction machine is advantageous in disposing the locking device for fixing the position of the air filter in the equipment room and in smoothly mounting or dismounting the air filter, even if the space in the equipment room on the upstream side of the air filter with respect to the airflow direction is limited. Specifically, in a small-slewable type construction machine, various pieces of equipment are densely disposed in an equipment room. In particular, in the case where an equipment such as an air cleaner is disposed on the upstream side of the air filter with respect to an airflow direction, there is hardly a space on the upstream side of the air filter. Accordingly, it is difficult or impossible to dispose a member for fixing the position of the air filter on the upstream side of the air filter, and to dismount the air filter from the air intake duct by taking out the air filter toward the upstream side. In contrast, in the construction machine according to the embodiment, by disposing the movable member of the locking device to the locking position, the air filter is sandwiched and held between the contact member and the movable member in front and rear directions, whereby the position of the air filter is fixed. Accordingly, there is no need of disposing a major portion of the locking device for fixing the position of the air filter on the upstream side of the air filter with respect to the airflow direction. Thus, it is possible to dispose the locking device for fixing the position of the air filter in the equipment room, even if the space in the equipment room on the upstream side of the air filter with respect to the airflow direction is limited.

Further, in the construction machine according to the embodiment, the filter mounting portion has a pair of guide members extending along an upper surface and a lower surface of the air filter, a contact member which is contacted with a front surface of the air filter, and a locking device which fixes a position of the air filter in a state that the front surface of the air filter is contacted with the contact member. The locking device has a movable member, when the movable member is in the locking position, the movable member contacts with a rear surface of the air filter so that the air filter is sandwiched and held between the movable member and the contact member, and when the movable member is in the lock-releasing position, the movable member is moved away from the rear surface of the air filter for allowing movement of the air filter toward the rear side. With this configuration, merely disposing the movable member to the lock-releasing position allows the air filter mounted to the filter mounting portion to move toward the rear side of the air filter, whereby it is allowed to take out the air filter toward the rear side along the paired guide members so that the air filter is smoothly dismounted from the equipment room through the maintenance hole. In other words, in the construction machine according to the embodiment, it is possible to perform an air filter exchange operation, even if a sufficient work space for dismountably mounting the air filter is not secured on the upstream side of the air filter with respect to the airflow direction.

In the construction machine described above, preferably, the locking device includes a shaft member having a central shaft portion which supports the movable member in such a manner that the movable member is pivotally movable between the locking position and the lock-releasing position and an engagement shaft portion which is disposed in parallel to the central shaft portion, and a retaining member which retains the central shaft portion in such a manner that the shaft member is freely movable in an axis direction of the central shaft portion. The movable member preferably has an engagement shaft through-hole through which the engagement shaft portion is inserted. The retaining member preferably has an engaged portion having such a shape as to be engageable with the engagement shaft portion. The shaft member is preferably retained by the retaining member in such a manner that the shaft member is movable between an engagement position and a disengagement position, the engagement position being a position in which the engagement shaft portion is engaged with the engaged portion for inhibiting pivotal movement of the movable member in the locking position about the central shaft portion relative to the retaining member, and the disengagement position being a position in which the engagement shaft portion is disengaged from the engaged portion for allowing pivotal movement of the movable member about the central shaft portion relative to the retaining member.

According to the above arrangement, disposing the shaft member in the engagement position inhibits pivotal movement of the movable member in the locking position by the engagement shaft portion. This is further advantageous in securing positional fixation of the air filter mounted to the filter mounting portion. Further, according to the above arrangement, since the central shaft portion as a center of pivotal movement of the movable member, and the engagement shaft portion for inhibiting pivotal movement of the movable member in the locking position are constituted by one shaft member, the above arrangement is advantageous in reducing the number of parts, thereby suppressing the manufacturing cost of the construction machine, and in reducing the installation space in the construction machine.

In the thus configured construction machine, one guide member of the paired guide members is preferably formed with a cutaway in a rear end thereof, the cutaway being opened rearward, and the one guide member extending along the upper surface of the air filter. Further, a rear end portion of the upper surface of the air filter is preferably provided with a projection member projecting upwardly, the projection member being fitted in the cutaway in a state that the air filter is mounted to the filter mounting portion.

According to the above arrangement, in the case where the air filter is accommodated in the space between the paired guide members, the projection member is fitted in the cutaway of the upper guide member, whereby it is possible to fix the position of the air filter in the thickness direction thereof.

As described above, according to the embodiment, even if the space in the equipment room on the upstream side of the air filter with respect to the airflow direction is limited, the above arrangement is advantageous in disposing the locking device for fixing the position of the air filter in the equipment room, and in smoothly mounting or dismounting the air filter.

This application is based on Japanese Patent Application No. 2012-002427 filed on Jan. 10, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

INDUSTRIAL APPLICABILITY

As described above, the embodiment provides practically advantageous effects i.e. disposing a locking device for fixing the position of an air filter in a limited space in an equipment room, and smoothly mounting or dismounting the air filter. Thus, the embodiment is useful, and the industrial applicability of the embodiment is high.

What is claimed is:

1. A construction machine, comprising:
a lower propelling body; and
an upper slewing body mounted on the lower propelling body,
the upper slewing body including a working attachment mounted thereto such that the working attachment is able to perform work at a front side of the upper slewing body relative to a front-rear direction of the upper slewing body, an equipment room cover which covers an equipment room provided on the upper slewing body, a radiator which is disposed in the equipment room, an air intake duct which is disposed on an upstream side of the radiator with respect to an airflow direction in the equipment room, and an air filter which filters an airflow to be taken into the air intake duct, wherein
the radiator has a core surface, and is disposed in such a manner that the core surface faces one side in width direction of the upper slewing body, the core surface being a surface for receiving an airflow taken into the radiator,
the air intake duct has a filter mounting portion to which the air filter is dismountably mounted,
the air filter has a filter surface, and is mounted to the filter mounting portion in a state that the filter surface faces the core surface of the radiator, the filter surface being a surface through which an airflow filtered through the air filter is allowed to exit,
the equipment room cover is formed with a maintenance hole at a position corresponding to a rear side of the air filter mounted to the filter mounting portion relative to the front-rear direction of the upper slewing body, and in a state that the filter surface faces the core surface of the radiator, the maintenance hole having such a shape as to allow the air filter to pass,
the filter mounting portion has a pair of guide members extending in a front-rear direction, relative to the front-rear direction of the upper slewing body, and along an upper surface and a lower surface of the air filter mounted to the filter mounting portion respectively, a contact member which is contacted with a front surface of the air filter mounted to the filter mounting portion, and a locking device which fixes a position of the air filter in a state that the front surface of the air filter is contacted with the contact member, the guide members are vertically spaced to form therebetween a space which houses the air filter, respective rear ends of the guide members defining an opening therebetween, the opening being opened rearward to allow the air filter to move away from the space to a rear side of the filter mounting portion through the opening, the locking device has a movable member which is configured to be movable between a locking position and a lock-releasing position, the movable member being configured in such a manner that when the movable member is in the locking position, the movable member contacts with a rear surface of the air filter in a state that the front surface of the air filter is contacted with the contact member while the air filter is housed in the space, thereby making the air filter be sandwiched and held between the movable member and the contact member, and that when the movable member is in the lock-releasing position, the movable member is apart from the rear surface of the air filter housed in the space to allow the air filter to slide rearward along the paired guide members so as to move away from the space through the opening.

2. The construction machine according to claim 1, wherein the locking device includes a shaft member having a central shaft portion which supports the movable member in such a manner that the movable member is pivotally movable between the locking position and the lock-releasing position and an engagement shaft portion which is disposed in parallel to the central shaft portion, and a retaining member which retains the central shaft portion in such a manner that the shaft member is freely movable in an axis direction of the central shaft portion, the movable member has an engagement shaft through-hole through which the engagement shaft portion is inserted, the retaining member has an engaged portion having such a shape as to be engageable with the engagement shaft portion, and the shaft member is retained by the retaining member in such a manner that the shaft member is movable between an engagement position and a disengagement position, the engagement position being a position in which the engagement shaft portion is engaged with the engaged portion for inhibiting pivotal movement of the movable member in the locking position about the central shaft portion relative to the retaining member, and the disengagement position being a position in which the engagement shaft portion is disengaged from the engaged portion for allowing pivotal movement of the movable member about the central shaft portion relative to the retaining member.

3. The construction machine according to claim 1, wherein one guide member of the paired guide members is formed with a cutaway in a rear end thereof, the cutaway being opened rearward, and the one guide member extending along the upper surface of the air filter, and a rear end portion of the upper surface of the air filter is provided with a projection member projecting upwardly, the projection member being fitted in the cutaway in a state that the air filter is mounted to the filter mounting portion.

4. The construction machine according to claim 2, wherein one guide member of the paired guide members is formed with a cutaway in a rear end thereof, the cutaway being opened rearward, and the one guide member extending along the upper surface of the air filter, and a rear end portion of the upper surface of the air filter is provided with a projection member projecting upwardly, the projection member being fitted in the cutaway in a state that the air filter is mounted to the filter mounting portion.

* * * * *